United States Patent
Kanaya et al.

(10) Patent No.: US 6,808,448 B1
(45) Date of Patent: Oct. 26, 2004

(54) METHOD AND DEVICE FOR DETECTING/ REMOVING CRUSTACEAN WITH UNTORN SHELL

(75) Inventors: Masatoshi Kanaya, Chiba (JP); Masahiro Niimoto, Chiba (JP)

(73) Assignee: Nichirei Corporation, Tokyo (JP)

( * ) Notice: Subject to any disclaimer, the term of this patent is extended or adjusted under 35 U.S.C. 154(b) by 0 days.

(21) Appl. No.: 10/069,954

(22) PCT Filed: Sep. 7, 2000

(86) PCT No.: PCT/JP00/06095
§ 371 (c)(1),
(2), (4) Date: Jul. 1, 2002

(87) PCT Pub. No.: WO01/17361
PCT Pub. Date: Mar. 15, 2001

(30) Foreign Application Priority Data

Sep. 8, 1999 (JP) .......................... 11-254230

(51) Int. Cl.⁷ .............................................. A22C 29/02
(52) U.S. Cl. .............................................. 452/2; 452/1
(58) Field of Search ................................ 452/1, 2, 3, 4, 452/5, 7, 8, 9, 10, 12, 180, 181, 184, 198, 18, 19, 20; 250/461.1

(56) References Cited

U.S. PATENT DOCUMENTS

| | | | |
|---|---|---|---|
| 3,067,328 A | | 12/1962 | Harrison ....................... 250/71 |
| 3,222,186 A | * | 12/1965 | D'Aquin ........................ 426/2 |
| 4,133,294 A | * | 1/1979 | Bolton et al. ................ 119/234 |
| 5,429,546 A | * | 7/1995 | Kou ................................ 452/1 |
| 5,522,764 A | * | 6/1996 | Keith et al. ..................... 452/5 |
| 5,902,177 A | * | 5/1999 | Tessier et al. ............... 452/156 |
| 5,928,072 A | * | 7/1999 | Fulcher et al. .................. 452/1 |
| 5,944,598 A | * | 8/1999 | Tong et al. .................. 452/158 |
| 6,042,465 A | * | 3/2000 | Larson et al. ................... 452/9 |
| RE36,664 E | * | 4/2000 | O'Brien et al. ............. 452/157 |

FOREIGN PATENT DOCUMENTS

| | | | |
|---|---|---|---|
| DE | 4301208 | * | 3/1994 |
| GB | 2 197 179 | | 5/1988 |
| JP | 1-105144 | * | 4/1989 |
| JP | 3-9252 | * | 1/1991 |
| JP | 4-58373 | * | 2/1992 |
| WO | WO 94/14327 | * | 7/1994 |
| WO | 98/44335 | | 10/1998 |

OTHER PUBLICATIONS

Copy of European Patent Office Communication including European Search Report for corresponding European Patent Application 00957002 dated Apr. 3, 2003.

* cited by examiner

Primary Examiner—Peter M. Poon
Assistant Examiner—David Parsley
(74) Attorney, Agent, or Firm—Westerman, Hattori, Daniels & Adrian, LLP

(57) ABSTRACT

A method and apparatus for detecting and removing unstripped residual shell left on shellfish. This method and apparatus are characterized by irradiating a light of specific wave-range onto stripped shellfish after finishing the shell-stripping work thereof. A CCD camera is used to examine the shellfish. It is then determined if there is residual shell on the stripped shellfish on the basis of information on the intensity of fluorescent light that can be obtained from the image taken by the CCD camera. Any shell is then removed.

9 Claims, 4 Drawing Sheets

(a)

(b)

(c)

(d)

FIG. 4A
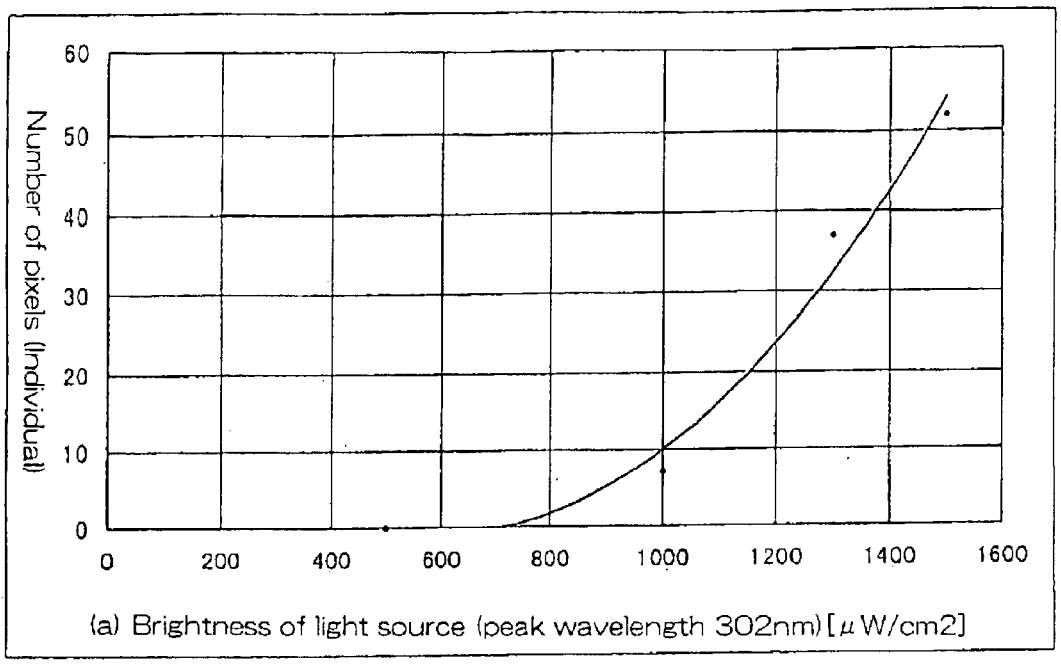
(a) Brightness of light source (peak wavelength 302nm) [$\mu$W/cm2]
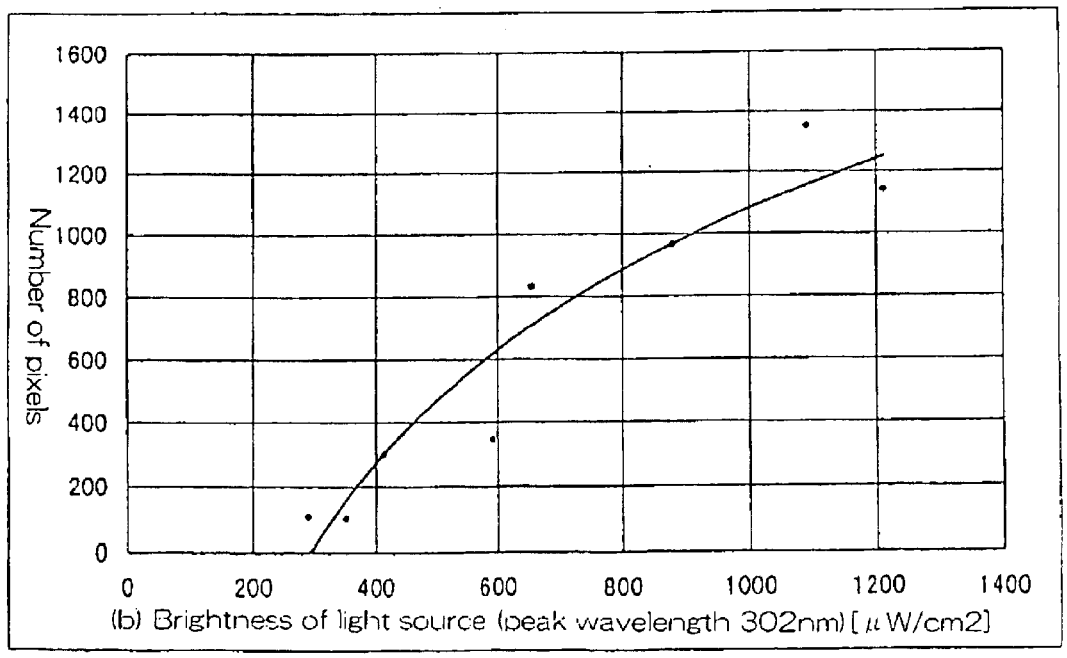
(b) Brightness of light source (peak wavelength 302nm) [$\mu$W/cm2]
FIG. 4B

METHOD AND DEVICE FOR DETECTING/REMOVING CRUSTACEAN WITH UNTORN SHELL

BACKGROUND OF THE INVENTION

The present invention relates to a method of detecting and removing unstripped residual shell left on shellfish and to the apparatus for carrying out the method, and in particular, to a detection and removal method and an apparatus for carrying out the method, which are suited for use in inspecting whether there is residual shell on the flesh of shellfish such as shrimp or crab, after finishing shell-stripping work. It should be noted that by the expression "shrimp" in the present specification, all kinds of shrimp and shellfish which is similar to shrimp, such as lobster and prawn, etc. are included.

As the food service industry becomes increasingly popular, various kinds of food materials are now increasingly processed in great quantities and in a standardized manner in food processing factories. This trend is the same in the case of shellfish such as shrimp or crab. That is, large quantities of shellfish for which the shell-stripping work has been done are now brought into food processing factories as one raw material (food material) for various kinds of processed foods or retort pouch foods.

Usually, the work of stripping the shell left on shellfish is performed at a location near a fishing ground, and the shellfish whose shell has been stripped off is then immediately frozen and only the flesh portion of shellfish is brought into a food processing factory. The work of stripping the shell from shellfish is generally performed manually, since the separation of the shell from the flesh can be relatively easily performed. However, it is still difficult to perform the shell-stripping work faultlessly, thereby failing to eliminate the possibility that shellfish with residual shell remaining on the flesh, or with a portion of removed shell or leg inadvertently mixed with the flesh, may be brought into the food processing factory. Therefore, a package of flesh portion of shellfish that has been brought into the food processing factory after finishing the shell-stripping work is usually investigated after unpacking through visual observation to see if there is a piece of shell intermingled with the flesh or residual shell left unremoved from the flesh. If a piece of residual shell is found in the flesh portion of shellfish, the piece of residual shell is manually removed therefrom.

In the case of most of shellfish, the shell thereof is discolored as it is heat-treated. Due to this discoloration of the shell, it can be relatively easily distinguished from the flesh portion thereof. Before heat-treatment, however, both the flesh portion and the shell thereof are whitish in most shellfish. Additionally, the residual shell that might be left on the flesh portion of shellfish is generally small in size. Therefore, it is difficult, before heat-treatment of shellfish, to visually distinguish the residual shell from the flesh portion even if a piece of residual shell is left in the flesh portion thereof, thus leaving the residual shell overlooked or unidentified occasionally. If a piece of shell is left intermingled in processed foods or retort foods, it would compromise the taste of consumers, and diminishing the commercial value thereof.

BRIEF SUMMARY OF THE INVENTION

The present invention has been made under such circumstances, and therefore, an object of the present invention is to provide a method of detecting and removing unstripped residual shell left on shellfish, which is suited for easily and reliably determining if there is any residual shell left on the stripped shellfish, thereby enabling the residual shell, if any, to be removed from the stripped shellfish. Another object of the present invention is to provide an apparatus for carrying out such a method.

With a view to solving the aforementioned problems, through extensive study and experiments conducted by the present inventors, it was finally found that when a light of a specific wave-range is irradiated onto shrimp or crab, a fluorescent light of a specific wave-range is emitted not from the flesh portion thereof but from the shell thereof. Namely, the present invention has been accomplished as a result of intensive study on this fact and is characterized by an irradiating light of a specific wave-range onto stripped shellfish after finishing the shell-stripping work thereof then, on the basis of information regarding the intensity of fluorescent light emitted from the shellfish, determining if there is any residual shell on the stripped shellfish, and subsequently removing any residual shell.

An alternative method of detecting and removing unstripped residual shell left on shellfish according to the present invention is characterized by irradiating a light of specific wave-range onto stripped shellfish after finishing the shell-stripping work thereof, taking an image of the stripped shellfish with a CCD camera, and on the basis of information on the intensity of fluorescent light emitted from the image of shellfish, determining if there is any residual shell on the stripped shellfish, and subsequently removing any residual shell.

By the expression of "a light of specific wave-range", it is meant a light of wave-range which is capable of causing emission of a fluorescent light more from the shell than from the flesh portion of a shellfish. For example, in the case where the shellfish is "shrimp", the wave-range of the light is preferably is not more than 400 nm, more preferably around 250 nm. In the case where the shellfish is "crab", the wave-range of the light is preferably is not more than 400 nm.

The apparatus for detecting and removing unstripped residual shell left on shellfish according to the present invention for achieving the aforementioned object is suited for use in carrying out the aforementioned method, and comprises a means for irradiating a light of specific wave-range onto stripped shellfish after finishing the shell-stripping work thereof; a detection means for detecting fluorescent light emitted from said shellfish; means for determining if there is residual shell on the stripped shellfish on the basis of information obtained from said detection means; and means for removing residual shell, if any, on the basis of information from said determining means.

The means for irradiating a light is a means for irradiating an excitation light having the aforementioned wave-range. The detection means may be provided with a filter which is capable of absorbing light of a specific wave-range emitted from the aforementioned light-irradiating means, but capable of allowing at least the fluorescent light emitted from the shellfish to pass therethrough. The aforementioned determining means should preferably be designed such that when the intensity of fluorescent light obtained from said light detection means exceeds a given threshold value, it determines the existence of residual shell. The means for removing the residual shell is designed to be actuated on the basis of the determination that there is residual shell, and can be constituted for instance by a device which makes use of air blowing for removing the residual shell or shellfish having the residual shell.

An alternative apparatus for detecting and removing unstripped residual shell left on shellfish, which is suited for use in carrying out the aforementioned method, is characterized in that it comprises; a means for irradiating light of a specific wave-range onto stripped shellfish after finishing the shell-stripping work thereof; a CCD camera disposed to face said stripped shellfish; a means for determining if there is residual shell on the stripped shellfish on the basis of information on the intensity of fluorescent light that can be obtained from the image taken by said CCD camera; and means for removing residual shell, if any, on the basis of information from said determining means.

The means in this alternative apparatus for irradiating light may be the same as that of the first mentioned apparatus. The CCD camera may be selected from those which are conventionally known, and may be either a black-and-white CCD camera or a color CCD camera. Where the CCD camera is constituted by a black-and-white CCD camera, the aforementioned determining means should preferably be designed such that each of the image signals from the black-and-white CCD camera is preferably binarized, and that when the number of pixels to be derived from fluorescent light obtained from the shellfish precisely speaking emitted from the shell of shellfish exceeds a given threshold value, it determines the existence of residual shell. On the other hand, where the CCD camera is constituted by a color CCD camera, the aforementioned determining means should preferably be designed such that the color of the fluorescent light emitted from the shell is designated, by means of an image processor, and when the number of pixels in the designated area exceeds a given threshold value, it determines the existence of residual shell. The means for removing the residual shell may be the same as that of the first mentioned apparatus.

BRIEF DESCRIPTION OF THE SEVERAL VIEWS OF THE DRAWING

FIG. 4a is a graph illustrating the relationship between the illuminance obtained as an image taken by a black-and-white CCD camera is binarized and the number of pixels detected; and FIG. 4b is a graph illustrating the relationship between the illuminance obtained as an image taken by a color CCD camera is processed by designating the color of fluorescent light emitted from the shell and the number of pixels detected.

DETAILED DESCRIPTION OF THE INVENTION

Next, a specific embodiment wherein an examination is performed as to whether there is any residual shell after the shell-stripping operation of shrimp and, if there is a residual shell, the residual is removed, will be explained with reference to the results of an actual experiment. In this experiment, shell-attached frozen shrimp (greasyback shrimp) employed as a sample were defrosted and then most of the shell thereof was manually stripped, leaving only a portion of the shell which is located on the joint immediately before the tail. The size of the shell-attached frozen shrimp corresponded to 100 to 200 pieces of shrimp per pound, and the size of the residual shell was about 8 mm×6 mm on the average.

Figure 3:
FIG. 3 is photographs wherein an images obtained by irradiating lights of different wavelengths onto a shrimp and taken by means of a black-and-white CCD camera are displayed, after the binarization thereof by means of an image processor, on a display.
Figure 3:
Figure 3:
Figure 3:

First of all, light from an ordinary light source (which is close to white light) having three peaks of 440 nm, 550 nm and 670 nm was irradiated onto each sample by making use of light-irradiating means at a light volume of 1000 $\mu$w/cm2. Then, a visual examination was performed to see if the shell can be distinguished from the flesh portion. However, it was impossible to distinguish the shell from the flesh portion. Then, the image of each sample was taken by means of black-and-white CCD camera and color CCD camera. However, it was impossible to distinguish the shell from the flesh portion on the basis of the image thus obtained. FIG. 3(a) is a photograph wherein an image of sample taken by means of a black-and-white CCD camera is displayed, after the binarization thereof by means of image processor, on a display. It was difficult to distinguish the shell from the flesh portion over the display.

Then, when a light (excitation light) having a peak wavelength of 302 nm which was derived by adjusting the light-irradiating means, was irradiated onto each sample under the same conditions as those of the above experiment, it was possible to visually recognize, though slightly, a difference in light emission between the flesh portion and the shell portion. When the light from each sample was allowed to pass through a filter which was capable of absorbing a light having a peak wavelength of about 302 nm (i.e. excitation light), it was possible to distinguish the flesh portion from the shell portion. Further, when an image of sample taken by means of a black-and-white CCD camera was displayed, after binarization thereof by means of image processor, on a display, it was possible as shown in FIG. 3(b) to recognize to some degree only the shell portion. Moreover, when an image of the sample taken by means of a color CCD camera was image-processed by designating the upper and lower limit of each of the RGB components of the fluorescent light emitted from the shell, it was possible to clearly distinguish the flesh portion from the shell portion.

In these experiments, a black-and-white CCD camera of 61200 pixels (255×240) whose photographing range was adjusted to 10 cm×9.4 cm, and a color CCD camera of 240000 pixels (500×480) whose photographing range was adjusted to 10 cm×9.6 cm were employed. FIG. 4a is a graph illustrating the relationship between the illuminance of the light source obtained and the number of pixels detected as an image taken by a black-and-white CCD camera was binarized; and FIG. 4b is a graph illustrating the relationship between the illuminance obtained as an image taken by a color CCD camera was processed by designating the color of fluorescent light emitted from the shell and the number of pixels detected. It was estimated that since the difference in resolution between the black-and-white CCD camera and the color CCD camera was about 1:2, a difference in the number of pixels that could be recognized between these cameras would be about 1:4. However, as seen from the comparison between these graphs, a difference in the number of pixels that could be recognized between these cameras was actually about 10:1100 (a comparison at a light volume of 1000 $\mu$w/cm2), thus confirming the fact that the distinguishability between the shell and the flesh portion can be particularly improved by making use of a color image.

Then, another experiment was performed under the same conditions as the above experiment except that light having a peak wavelength of 254 nm was substituted for the light employed in the above experiment, thereby making it possible to detect a stronger fluorescent light from the shell portion. Further, as shown in FIG. 3c, the number of pixels that could be recognized by means of the black-and-white CCD camera was particularly increased as compared with that which could be recognized when light having a peak wavelength of 302 nm was employed. Results which were similar to the above could be obtained when an image taken by means of the color CCD camera was utilized.

Furthermore, an experiment was further performed under the same conditions as the above experiment except that light having a peak wavelength of 352 nm was substituted for the light employed in the above experiment, thereby obtaining almost the same detection intensity of fluorescent light as that obtained when a light having a peak wavelength of 254 nm was employed. As shown in FIG. 3d however, since the difference in the number of pixels between the flesh portion and the shell portion became smaller when the image taken by the black-and-white CCD camera was processed for binarization thereof, it was impossible to identify only the shell portion. This may be attributed to the fact that since identification of the shell portion was based solely on the brightness thereof, the color difference thereof could not be identified. By contrast, in the case of the image taken by means of the color CCD camera, it was possible to clearly distinguish the flesh portion from the shell portion.

It was found from the results of these experiments that in the case of shrimp, the manner of emitting fluorescent light in response to the excitation light of specific wave-range (for example, 254 nm, 302 nm or 352 nm in peak wavelength) differs between the flesh portion and the shell portion, and that the fluorescent light to be emitted from the shell in response to the excitation light can be selectively distinguished from the fluorescent light (if any) to be emitted from the flesh portion by making use of a band pass filter or by suitably processing the information on the image that can be obtained from the CCD camera. As for the band pass filter, a filter which permits light having a wavelength of not more than about 400 nm to pass therethrough or to be absorbed therein can be preferably employed.

When experiments similar to the above experiments were performed on kuruma prawn, pink shrimp, Japanese glass shrimp, botan shrimp, giant tiger prawn and fleshy prawn, results almost identical to those obtained using the aforementioned greasyback shrimp were obtained. In all of these experiments, the employment of a light having a peak wavelength of 254 nm was found most preferable in obtaining better identification of the shell. Therefore, as far as shrimp is concerned, an excitation light having a peak wavelength of 254 nm was assumed to be most suited for detecting the shell. Further, experiments which were similar to the aforementioned experiments on shrimps were performed using frozen snow crab and swimming crab after these frozen snow crab and swimming crab were allowed to defrost. When the experiments were performed using the irradiation of white light, it was found difficult to distinguish the shell from the flesh portion thereof. However, when excitation light having a peak wavelength of 254 nm, 302 nm or 352 nm was employed, it was found possible, in all of these wavelengths, to clearly distinguish the shell from the flesh portion thereof. However, when light having a peak wavelength of more than 400 nm was employed, it was found difficult to distinguish the shell from the flesh portion thereof. Therefore, as far as crab is concerned, the employment of a light having a peak wavelength of 400 nm or less has been found most suited for detecting the residual shell.

Next, the method and apparatus for judging if there is any residual shell that has been left unstripped from shrimp (or crab) after finishing the shell-stripping work thereof and for removing the residual shell if any, which have been devised based on the findings obtained from the aforementioned experiments will be explained.

Figure 1:
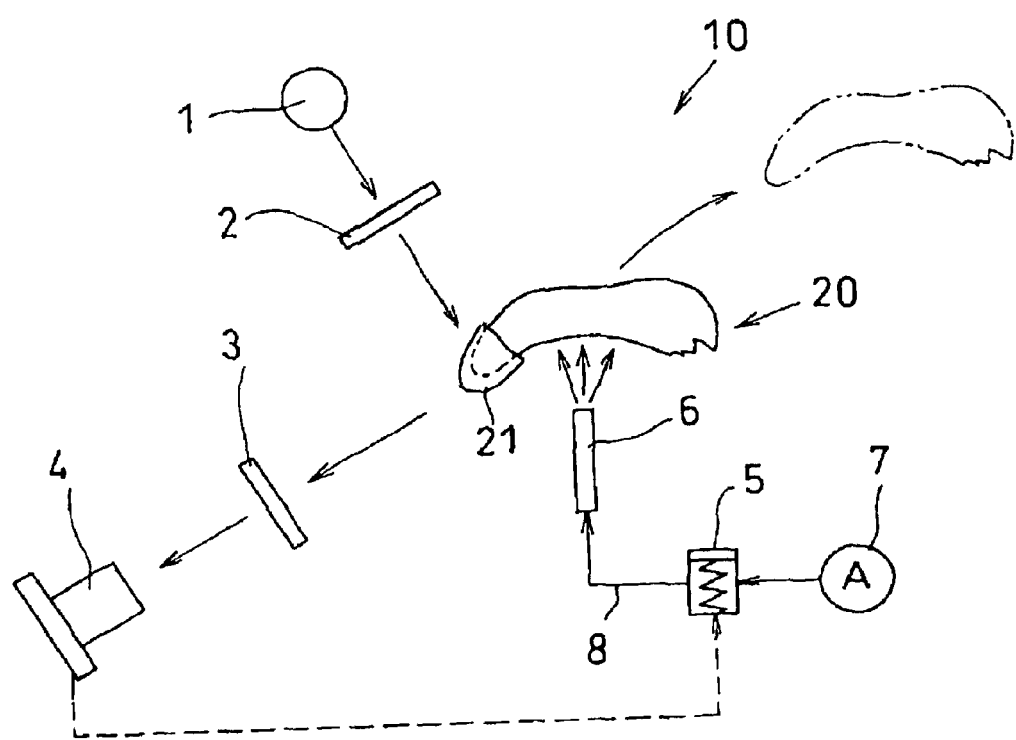
FIG. 1 is a diagram illustrating one embodiment of the apparatus for detecting and removing unstripped residual shell left on shellfish according to the present invention.

Referring to FIG. 1, a device 10 for detecting and removing unstripped residual shell is composed of a light source 1 as a light-irradiating means for irradiating a beam of light onto a shrimp 20, a first filter 2 for enabling only a light of specific wave-range among the light emitted from the light source 1 to selectively pass therethrough, a second filter 3 for enabling only a light of specific wave-range among the light emitted from the shrimp 20 to selectively pass therethrough, a determining means 4 for detecting the light passed through the second filter 3 and determining the intensity of the light, a normal closed valve 5 which is designed to open on the basis of signals from the determining means 4, an air nozzle 6 having an ejection port directed to the shrimp 20, an air tank 7, and a piping 8 for connecting the air nozzle 6 via the normal closed valve 5 with the air tank 7.

In this embodiment, the first filter 2 enables a light of about 254 nm in peak wavelength to pass therethrough, while the second filter 3 enables a light of not more than 400 nm in wavelength to pass therethrough. The determining means 4 is designed such that when the intensity of the light that has been passed through the second filter 3 exceeds a given value, it emits a signal to open the normal closed valve 5, thereby allowing the compressed air inside the air tank 7 to eject from the air nozzle 6 so as to blow away the shrimp 20.

According to this apparatus, the shrimp 20 is continuously fed to the irradiation region of light emitted from the light source 1. The light (excitation light) of about 254 nm in wavelength that has been passed through the first filter 2 is then irradiated onto the shrimp 20 being introduced into the irradiation region. If there is no residual shell 21 left on the shrimp 20, the determining means 4 refrains from emitting a signal to open the normal closed valve 5, thereby allowing the shrimp 20 to be transferred as is along the ordinary transfer passageway. When the shrimp 20 having a residual shell 21 is introduced into the irradiation region, the fluorescent light emitted from the shell 21 is allowed to pass through the second filter 3 so as to be detected by the determining means 4. When it is determined by the determining means 4 that the intensity of light thus detected exceeds a given value, a signal to open the normal closed valve 5 is emitted. As a result, the compressed air inside the air tank 7 is ejected from the air nozzle 6 against the shrimp 20 so as to blow the shrimp 20 out of the transferring passageway.

Although the determining means 4 is employed in the aforementioned embodiment for determining the intensity of light, the light passed through the second filter 3 may be determined through the observation by an operator, thereby allowing the normal closed valve 5 to be operated by an operator. Further, the shrimp accompanying a residual shell may be manually removed by an operator. When a filter which is capable of absorbing a light having the same wavelength as that of the excitation light is employed as the second filter 3, it would become possible to prevent the scattering of the irradiating light, thus preventing the generation of a stray light which may enter into the determining means 4 or the operator.

Figure 2:
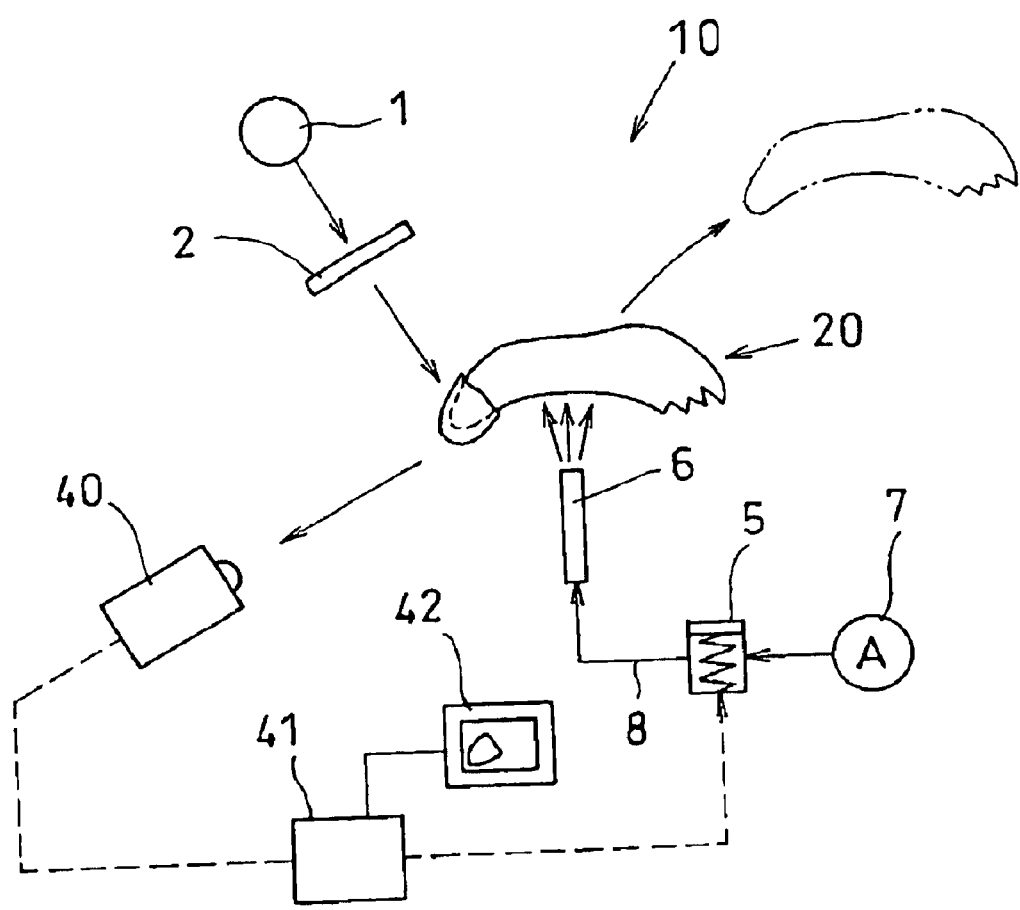
FIG. 2 is a diagram illustrating another embodiment of the apparatus for detecting and removing unstripped residual shell left on shellfish according to the present invention.

A black-and-white CCD camera or a color CCD camera may be substituted for the determining means 4 for determining the intensity of light. FIG. 2 shows one example of the apparatus for detecting and removing unstripped residual shell left on shellfish where a CCD camera 40 is employed. In this FIG. 2, the same components as those of FIG. 1 are represented by the same reference numerals as shown in FIG. 1. In this case, the light emitted from the shrimp 20 is taken up as an image signal by the CCD camera 40, and the image signal is then suitably processed by an image processor 41. The image thus processed is then displayed on a display screen 42 and at the same time, the normal closed valve 5 is opened in response to the signal from the image processor 41.

As explained above, in the case of the black-and-white CCD camera, a threshold value is set in such a manner that as large area of the shell portion as possible can be displayed in white within a range of value where the flesh portion can be displayed in black. The image signal is then processed for the binarization thereof, and when it is found that the image region (the number of pixels) exceeds a given value, a signal to open the normal closed valve 5 is emitted from the image processor 41. In the case of a color CCD camera, the image processing is performed by designating the color of fluorescent light to be emitted from the shell, and when it is found that the corresponding image region (the number of pixels) exceeds a given value, a signal to open the normal closed valve 5 is similarly emitted from the image processor 41. In this case also, the normal closed valve 5 may be manually operated by an operator while observing the image displayed on the display screen 42, and the shrimp having residual shell may be manually removed by the operator.

As explained above, according to the method and apparatus for detecting and removing unstripped residual shell left on shellfish as proposed by the present invention, an excitation light of specific wave-range which enables a fluorescent light to be emitted not from the flesh portion thereof but from the shell portion thereof is irradiated onto stripped shellfish to see if there can be observed the fluorescent light of specific wave-range for the purpose of distinguishing between the flesh portion and shell portion of shellfish; this distinction being generally considered to be very difficult if it is tried through visual observation. Therefore, when there is any unstripped residual shell in the flesh portion of shellfish after the shell-stripping work thereof, the residual shell can be easily and reliably identified and removed from the line, thus making it possible to automatize and speed up the process.

What is claimed is:

1. A method of detecting and removing a shell residue left in a shellfish flesh portion, comprising:

irradiating a light having a peak wavelength from 254 nm to 400 nm directly onto a shellfish flesh portion after finishing a shell-stripping work, wherein the light makes a fluorescent light emit more from the shell residue than from the shellfish flesh portion;

detecting the fluorescent light emitted from the shell residue; and removing the shellfish with the shell residue from further processing.

2. A method of detecting and removing a shell residue left in a shellfish flesh portion according to claim 1, wherein the fluorescent light emitted from the shellfish flesh portion is detected by a CCD camera.

3. A method of detecting and removing a shell residue left in a shellfish flesh portion according to claim 1, wherein the shellfish flesh portion comes from shrimp, and wherein the irradiated light has a peak wavelength of not more than 254 nm.

4. A method of detecting and removing a shell residue left in a shellfish flesh portion according to claim 1, wherein the shellfish flesh portion comes from crab.

5. A method of detecting and removing a shell residue left in a shellfish flesh portion according to claim 1, wherein the irradiated light is an excitation light.

6. A method of detecting and removing a shell residue left in a shellfish flesh portion according to claim 1, wherein the fluorescent light is detected through a filter, and wherein the filter absorbs the irradiated light and passes the emitted fluorescent light.

7. An apparatus for detecting and removing a shell residue left in a shellfish flesh portion, comprising:

a light source provided for irradiating a light having a peak wavelength from 254 nm to 400 nm directly onto a shellfish flesh portion after finishing a shell-stripping work, wherein the irradiated light makes a fluorescent light emit more from the shell residue than from the shellfish flesh portion;

a detecting means provided for detecting the fluorescent light emitted from the shell residue; and a means provided for removing the detected shellfish with the shell residue from further processing.

8. An apparatus for detecting and removing a shell residue left in a shellfish flesh portion according to claim 7, further comprising a CCD camera provided for detecting the fluorescent light.

9. An apparatus for detecting and removing a shell residue left in a shellfish flesh portion according to claim 7, further comprising a filter provided between the shellfish flesh portion and the detecting means, wherein the filter absorbs the irradiated light and passes the emitted fluorescent light.

\* \* \* \* \*